United States Patent

Calvo et al.

[11] Patent Number: 5,914,196
[45] Date of Patent: Jun. 22, 1999

[54] ARTICLE HAVING MULTICOLOR SURFACE COATING

[75] Inventors: Luis M. Calvo, Bayshore; Steve Noskin, Dix Hills; Samsoodeen Kahan, Brentwood, all of N.Y.

[73] Assignee: Polymer Plastics Corp., Hauppauge, N.Y.

[21] Appl. No.: 08/777,459

[22] Filed: Dec. 30, 1996

Related U.S. Application Data

[60] Provisional application No. 60/016,372, Apr. 19, 1996.

[51] Int. Cl.$^6$ ........................................................... B32B 27/32
[52] U.S. Cl. ............................................. 428/523; 427/421
[58] Field of Search ............................... 427/421; 428/523

Primary Examiner—Bernard Pianalto
Attorney, Agent, or Firm—Darby & Darby

[57] ABSTRACT

A water-born multicolored surface coating with high shear resistance is provided. Specifically, a water-born multicolored surface coating capable of being applied using conventional spraying equipment without homogenization of the separate colors is provided. Also described are properties of the surface coating and methods for its application.

14 Claims, No Drawings ized surface coatings to dispense with a second costly spraying
ARTICLE HAVING MULTICOLOR SURFACE COATING This application claims priority pursuant to 35 U.S.C. § 119 from provisional application Ser. No. 60/016,372, the disclosure of which is incorporated herein by reference in its entirety.

FIELD OF THE INVENTION

The present invention relates to multicolored surface coatings and methods for their application. In particular, the invention relates to multicolored surface coatings that are sprayable and water-born, and more particularly, to coating that are shear-resistant, as well as methods for making and applying such coatings.

BACKGROUND OF THE INVENTION

Multicolor surface coatings have been used successfully for a number of years in both commercial and institutional applications. The original multicolor surface coatings were based on a water and organic solvent incompatibility. This incompatibility keeps the different colors separated, thus creating a multicolor system with one application of the surface coating. With the escalation of environmental concerns, there arose a need to reduce or eliminate the organic solvents in the system. In response to this need, water-born multicolor surface coating compositions were developed.

A major drawback of the prior art water-born multicolor surface coating technology is that special, expensive spray equipment is required to apply the prior art surface coatings. This special equipment is called "High Volume Low Pressure" (HVLP) equipment. It is required because when sprayed at pressures typical for other surface coatings, the prior art multicolored surface coatings lose their multicolor effect due to shearing of the different color particles in the coating into smaller particles, which then fuse together into a single color. It would be of great benefit to be able to use conventional spraying equipment to apply multicolor surface coatings. A multicolor surface coating which could tolerate higher shear forces would allow users of multicolor surface coatings to dispense with a second costly spraying system, as well as reduce the amount of equipment that would need to be transported. However, until the present invention, no such coating was available.

It was thus surprising and unexpected when the inventors discovered that the inclusion of a hydrophobic filler, such as a hydrophobic fumed silica, in the formulation of the water-born multicolor surface coating of the invention gave the coating much higher shear resistance, resulting in a product which can be sprayed at higher pressures than the prior art water-born multicolored surface coatings. The hydrophobic nature of the filler keeps the color particles separate from each other during spraying. The shear-resistant property of the present invention, as indicated above, will allow application of multicolored surface coatings with conventional high pressure spraying apparatus, allowing for significant economies of money and space. In addition to conventional spray equipment, the coating of the invention can also be sprayed with HVLP equipment.

SUMMARY OF THE INVENTION

The present invention provides shear-resistant, water-born multicolored surface coatings comprised of water, water-miscible solvents, pigments, a gel-forming agent, a suspending agent, a dispersant, surfactants, microbicides, a blocking agent, a coalescent agent, a vinyl ester latex, and a hydrophobic filler.

Also provided are methods for formulating the coatings of the invention.

Also provided are methods for the application of the shear-resistant, water born multicolored surface coatings of the invention with conventional paint spraying equipment. Conventional spraying equipment refers to equipment which allows the spraying of coatings, using a compressor to provide air pressures of from 15 to 150 pounds per square inch to propel coatings.

DETAILED DESCRIPTION OF THE INVENTION

Terms used is this specification have their ordinary meaning and usage unless otherwise indicated. Certain terms are defined below, and have the meaning specified when used herein and in the context of this invention.

Definitions

A gel-forming agent is a compound or composition that acts to provide thixotropy to a paint composition, meaning that the paint will liquify when agitated and harden upon standing. Preferred gel-forming agents are synthetic smectite clays. Most preferred is Laponite® (Southern Clay Products, Gonzales, Tex.).

A blocking agent, such as tetrasodium pyrophosphate, functions to prevent the gel-forming agent from gelling immediately, allowing time for pigmented phase incorporation.

A coalescent agent aids in the formation of an even film of the paint when it is applied to a surface. A preferred coalescent agent is Texanol® (Eastman Chemical Co., Kingsport Tenn.).

A suspending agent is a compound or composition that acts to keep fillers in suspension. A preferred suspending agent is hydroxyethyl cellulose. Most preferred is Natrosol® (Aqualon Co., Wilmington, Del.).

A dispersing agent is a compound or composition that acts to keep fillers dispersed, i.e to prevent agglomeration. Preferred dispersing agents are sodium salts of polymeric carboxylic acids. Most preferred is Tamol® (Rohm & Haas, Philadelphia, Pa.).

A surfactant is a compound or composition that acts to minimize bubble formation. Preferred surfactants are Triton™ CF-10 (Union Carbide, Danbury, Conn.), Bubble Breaker 748 (Witco, Houston, Tex.) and Nopco NXZ.

A microbicide is a compound or composition capable of killing or inhibiting the growth of microbes such as bacteria and fungi. Preferred microbicides are Nuosept 95 (Cosan Chemical Co., Carlstadt, N.J.) and Fungitrol 234 (Huls America, Inc., Piscataway, N.J.).

A water-miscible solvent is a solvent capable of mixing with water in all proportions. A preferred water-miscible solvent is propylene glycol.

A pigment is a compound or composition capable of imparting color or tint. Pigments suitable for use in the invention are well known, and can be obtained from many sources. Examples of suitable pigments are, for example, water-based pigments based on iron oxides and carbon block. Pigment dispersions can be obtained from commercial sources, such as Color Corporation of America, (Rockford, Ill.) and Huls America (Piscataway, N.J.).

A vinyl ester latex is a compound or composition which provides abrasion, alkali, and shear resistance to a paint composition. The preferred vinyl ester latex is UCAR® 2300 which has a total solids content, in percentage by weight, of 54 to 56 percent, has a pH value of 4.5 to 5, has a Brookfield Viscosity of 50 to 200 centipoise, has a wet weight per gallon of 8.85 pounds, has a minimum filming temperature of 14° C., and has a glass transition temperature midpoint value of 15° C. (Union Carbide Co., Cary, N.C.).

A hydrophobic filler is a typical filler well known in the art, such as silica, calcium carbonate, barium sulfate, and other naturally occurring minerals, which has been treated with an agent which imparts hydrophobicity to the filler. Such hydrophobicizing agents are preferably silanes or siloxanes, but can be any agent compatible with the paint composition which imparts hydrophobicity to a filler. A preferred hydrophobic filler is fumed silica, which is a hydrophilic silica which has been surface treated by "fuming" with hexamethyldisilazane (HMDS) to provide hydrophobicity. Fumed silica is available commercially, for example from Wacker-Chemie GMBH, Munich, Germany.

A primer is a water based acrylic primer that functions to reduce surface porosity and seal the substrate to be painted in order to reduce absorption of the paint by the substrate.

Preferred Embodiments of the Invention

The present invention is a shear-resistant water-based multicolored coating composition. In the formulation of the invention, a clear base, a neutral base and/or a white base are initially prepared. The white and neutral bases are used as carriers for pigments during formulation, and, once colored or tinted, are mixed with the clear base to make the final product. The white base is comprised of neutral base which has been formulated to contain a white pigment (such as titanium dioxide). A desired color is made by adding appropriate pigments to the white or neutral base. Colors can then be combined in the final, packaged product by admixing each color with the clear base.

The white or neutral base typically is comprised of water, water-miscible solvents such as propylene glycol, a gel-forming agent such as a clay, a suspending agent such as hydroxyethyl cellulose, a dispersing agent such as a sodium salt of a polymeric carboxylic acid, surfactants such as nonionic detergents, microbicides such as bactericides and fungicides, appropriate pigment(s) (calcium carbonate in the case of the neutral base, calcium carbonate and titanium dioxide in the case of the white base), a coalescent agent such as 2,2,4-trimethyl-1,3-pentanediol monoisobutyrate (Texanol®, a vinyl ester latex such as UCAR® 2300, and a hydrophobic filler such as fumed silica.

The white base is formulated by first mixing water with the gel-forming agent. After mixing until the gel-forming agent is entirely solubilized, the suspending agent, dispersing agent, surfactants, microbicides, and propylene glycol are added and thoroughly mixed (until homogeneous) for 5–10 min at 50–100 rpm. Subsequently, a white pigment such as titanium dioxide and a neutral pigment such as calcium carbonate are added and mixed in for 10 min at 100–500 rpm. A vinyl ester latex, more surfactant, a coalescent agent, and hydrophobic filler are then added and mixed thoroughly, until lump-free, which typically takes 15 at 100–500 rpm. The amount of vinyl ester latex added should typically be between about 5 and about 50 weight percent of the white base, and preferably about 28 percent. The amount of hydrophobic filler should typically be between about 0.5 and about 5 weight percent of the white base, and preferably about 2 percent.

The neutral base is prepared by the same method, using the same proportions of ingredients as the white base, except that a white pigment is not added to the mixture.

The white base and neutral base are then tinted to different colors by the addition of the desired pigments. The intensity of the colors can be varied by varying the amount of pigment added to the white and neutral bases by methods well-known in the art. The pigments and bases should be mixed for 5 minutes at 50 rpm to produce a tinted base or "color." The white base and neutral bases can be "colors" by themselves.

The clear base is typically comprised of water, a blocking agent such as tetrasodium pyrophosphate, a gel-forming agent such as Laponite®, and a microbicide such as Nuosept 95. The clear base is made by mixing water and blocking agent until it is completely dissolved. Subsequently, the gel-forming agent, microbicide, and more water are added. The components are mixed thoroughly until the gel forming agent is fully hydrated.

In one embodiment, to make the final multicolored sprayable surface coating the desired colors are separately mixed into the clear base. That is, one color is added and stirred until evenly dispersed, and then the next color is added and mixed, and so on. Stirring should occur with a mixer speed of less than 50 rpm. The proportions of different colors will vary depending on the effect desired in the final painted surface. The colors should comprise from about 5 to about 50 percent of the final coating composition by weight, with clear base making up the balance of the composition. The final mixture is then allowed to thicken overnight after which the multicolor paint can be packaged.

Table 1 indicates exemplary ingredients and their quantities in the clear, neutral, and white bases of the coating composition.

TABLE 1

| CLEAR BASE | |
| --- | --- |
| INGREDIENT | QUANTITY (WT %) |
| WATER | (25–95) |
| GEL-FORMING AGENT | (.2–20) |
| BLOCKING AGENT | (.1–40) |
| BACTERICIDE | (.1–10) |

| NEUTRAL AND WHITE BASES | | |
| --- | --- | --- |
| | QUANTITY (WT %) | |
| INGREDIENT | WHITE | NEUTRAL |
| WATER | (20–60) | (20–60) |
| GEL-FORMING AGENT | (.2–20) | (.2–20) |
| SUSPENDING AGENT | (.1–6) | (.1–6) |
| DISPERSANT | (.1–6) | (.1–6.0) |
| SURFACTANT A | (.1–3) | (.1–3) |
| SURFACTANT B | (.1–4) | (.1–4) |
| BACTERICIDE | (.5–5) | (.5–5) |
| FUNGICIDE | (.1–10) | (.1–10) |
| WATER-MISCIBLE SOLVENT | (.1–10) | (.1–10) |
| WHITE PIGMENT | (2–50) | N/A |
| NEUTRAL PIGMENT | (.05–10) | (.1–50) |
| VINYL ESTER LATEX | (10–80) | (10–80) |
| COALESCENT AGENT | (.05–10) | (.05–10) |
| HYDROPHOBIC FILLER | (.1–10) | (.1–10) |

In another embodiment, the sprayable multicolor paint can be prepared with color combinations selected by the consumer at the point of sale. This paint can be prepared according to the following method.

The clear base of the invention is shaken for one to two minutes in a paint shaking machine, and added to a sealable container. This sealable container, containing the clear base, will house the finished product. The white and neutral bases of the invention are packaged in containers of discrete volume, e.g. pint, quart, gallon, five gallon or 30 gallon containers. The amount of white or neutral bases utilized in the final composition will be dependent on the amount of colors added to the base (i.e. the intensity of the color) and the desired volume of the finished product. Typically, the amount of colored base which is added to the clear base comprises from 5 to 25 weight percent of the final product.

Each color which is desired to be present in the final multicolored paint is made individually by adding the desired pigments into the white or neutral bases. The colors are then mixed sequentially into the clear base to prepare the finished product, which is then sealed in its container.

The final multicolored sprayable surface coating should be stored and applied at a temperature not less than 50° F. Wide variations in temperature immediately after application should be avoided, as they might result in condensation on freshly coated surfaces which can adversely affect drying.

The application characteristics of the coating are as follows. The coating has a coverage rate of about 60–150 square feet per gallon. The coating displays no cracking or checking when bent around a 1/8" diameter mandrel, and displays no lifting or blistering when recoated after 8 hours. The coating can withstand 10% sodium hydroxide for 3 hours, is not stained by mild acids, chemicals, oils, and foods, and resists signs of wear after 800 rubs as per ASTM D-2486.

The multicolored sprayable surface coating of the invention is applied to surfaces as follows. Standard procedures normal to the painting profession for using conventional paint products should be followed. A suitable undercoat or primer should preferably be used prior to application, depending on the surface. For example, a primer such as Vitricoat Primer (Vitricon, Inc., Hauppauge, N.Y.) should be used on exterior masonry surfaces and over pre-existing coatings. Bare metal must be primed with a rust-inhibiting primer, preferably with Polyseal ZC Primer. Bare wood must be primed with an oil-type wood primer or enamel undercoater. On drywall, it is preferred that a primer such as Vitricoat Primer be used to eliminate telegraphing of joints. On masonry block walls, a primer such as Vitricolor Primer should be used to fill pores and voids.

Exterior chalking surfaces should be sandblasted prior to application. All interior glossy surfaces should be cleaned with a detergent to remove dirt, grease, and debris. The coating should not be applied to damp surfaces.

The coating of the present invention can be sprayed, for example, with a Binks 2001 paint sprayer with a cup at incoming pressure of 15–100 psi, pot pressures of 3–5 psi. The tip at the nozzle of the sprayer can be a 66 SD type, or one such as a 200 tip from Binks (Franklin Park, Ill.). Water should always be run through the spray equipment to be used prior to the application of the sprayable multicolored coating. The coating should be stirred slowly prior to application, and the coating container should be shaken gently periodically during application to facilitate spraying.

EXAMPLE 1

A representative shear-resistant sprayable multicolored coating of the present invention was prepared as follows.

White base was prepared by adding 443 g of Laponite® to 3.9 gallons of water, followed by mixing until the Laponite® was fully hydrated. To this mixture was then added 208 g of Natrosol®, 349 g of Tamol®, 99 g of Triton™ CF-10, 99 g of Bubble Breaker 748, 323 g of Nuosept 95, 411 g of Fungitrol, and 297 g of propylene glycol. These components were then mixed to an even dispersion. Then, 1005 g of titanium dioxide and 30 pounds of Veramite/Duramite (calcium carbonate) were added and dispersed well. Finally, 3.4 gallons of UCAR® Latex 2300, 52 g of Bubble Breaker 748, 52 g of Texanol® and 885 g of Wacker H200 fumed silica were then added and the mixture was stirred until lump free.

Neutral base was prepared by adding 10.4 lbs of Laponite® to 42 gallons of water, followed by mixing until the Laponite® was fully hydrated. To this mixture was then added 4.9 lbs of Natrosol®, 8.2 lbs of Tamol®, 1060 g of Triton™ CF-10, 1060 g of Bubble Breaker 748, 7.6 lbs of Nuosept 95, 9.7 lbs of Fungitrol, and 7 lbs of propylene glycol. These components were then mixed to an even dispersion. Then, 344 lbs of Veramite/Duramite (calcium carbonate) were added and dispersed well. Finally, 296 lbs of UCAR® Latex 2300, 558 g of Bubble Breaker 748, 558 g of Texanol® and 21 lbs of Wacker H200 fumed silica were then added and the mixture was stirred until lump free.

Clear base was prepared by adding 48 g of tetrasodium pyrophosphate to 7.9 gallons of water and letting it dissolve completely. To the tetrasodium pyrophosphate solution was then added 4.4 pounds of Laponite®, 79 g of Nuosept 95, and 3.5 more gallons of water. The components were then mixed thoroughly at medium shear, i.e., at about 100–200 RPM. The clear base was used the same day as it was prepared.

The compositions of the clear, neutral, and white bases of this Example are set out in Table 2, below.

TABLE 2

CLEAR BASE

| INGREDIENT | QUANTITY |
| --- | --- |
| WATER | 7.9 gallons |
| Laponite ® (GEL-FORMING AGENT) | 4.4 lbs |
| Tetrasodium pyrophosphate (BLOCKING AGENT) | 48 g |
| Nuosept 95 (BACTERICIDE) | 79 g |

WHITE AND NEUTRAL BASES

| | QUANTITY | |
| --- | --- | --- |
| INGREDIENT | WHITE | NEUTRAL |
| WATER | 3.9 gallons | 42 gallons |
| Laponite ® (GEL-FORMING AGENT) | 443 g | 10.4 lbs |
| Natrosol ® (SUSPENDING AGENT) | 208 g | 4.9 lbs |
| Tamol ® (DISPERSANT) | 349 g | 8.2 lbs |
| Triton ™ CF-10 (SURFACTANT A) | 99 g | 1060 g |
| Bubble Breaker 748 (SURFACTANT B) | 151 g | 1618 g |
| Nuosept 95 (BACTERICIDE) | 323 g | 7.6 lbs |
| Fungitrol 234 (FUNGICIDE) | 411 g | 9.7 lbs |
| Propylene glycol (WATER-MISCIBLE SOLVENT) | 297 g | 7 lbs |
| Titanium dioxide (WHITE PIGMENT) | 1005 g | 0 g |
| Calcium carbonate (NEUTRAL BASE) | 30 lbs | 344 lbs |
| UCAR ® 2300 (VINYL ESTER LATEX) | 3.4 gallons | 296 lbs |
| Texanol ® (COALESCENT AGENT) | 52 g | 558 g |
| Wacker H2000 (HYDROPHOBIC FILLER) | 885 g | 21 lbs |

The following tinted base compositions (or "colors") were prepared. Color number 1 was prepared by mixing 3 g of Lamp Black B with 755 g of white base until evenly dispersed. Color number 2 was 503 g of the white base, untinted. Color number 3 was prepared by mixing 126 g of neutral base with 7 g of Red Oxide F and 1 g of Lamp Black B and mixing thoroughly. Color number 4 was prepared by mixing 126 g of neutral base with 8 g of Lamp Black B and mixing thoroughly. (All pigment dispersions in this example were obtained from Color Corporation of America.)

The final coating was prepared by adding the colors, in the amounts indicated above, one by one, into 5.7 pounds of the clear base. After the addition of each color, the mixture was thoroughly dispersed by stirring at less than 50 rpm. After all the colors had been added, the coating composition was allowed to thicken overnight. The composition was then packaged. The shelf life of the composition is approximately six months.

EXAMPLE 2

One gallon of a blue and pink multicolor paint is prepared on-site by using two one-pint portions of white base and three quarts of clear base. Before use, the three quarts of clear base are placed in a one gallon sealable container, which is shaken in a paint shaking machine for one or two minutes. Two pint containers of white base are used for color preparation. Blue pigment (5 percent by weight of the white base) is added to one pint of the white base and mixed to create a light blue color. The light blue color is then added to the clear base and stirred by hand with a spatula. The pink color is then prepared by adding red pigment (5 percent by weight of the white base) to a pint of the white base and then mixing by hand with a spatula. The pink color is then added to the clear base which contains the light blue color. The product is mixed by hand with a spatula, and is sealed in its container, resulting in a custom-colored blue and pink multicolor paint.

What is claimed is:

1. An article comprising a surface, said surface having thereon a multicolored surface coating comprising a plurality of colors and a clear base wherein:

said colors are comprised of pigments and a member selected from the group consisting of a neutral base and a white base; and said neutral base and said white base are comprised of a hydrophobic filler and a vinyl ester latex.

2. The article of claim 1, wherein said hydrophobic filler is a mineral treated with silane or siloxane hydrophobicizing agents.

3. The article of claim 2, wherein said hydrophobic filler is a hydrophobic fumed silica.

4. The article of claim 2 wherein said colors are present in an amount from about five to about fifty percent by weight of said coating.

5. The article of claim 2, wherein said hydrophobic filler is present in said white and said neutral bases at from about 0.5 to about 5 percent by weight of said bases.

6. The article of claim 2, wherein said hydrophobic filler is present in said white and said neutral bases at about 2 percent by weight of said bases.

7. The article of claim 2, wherein said hydrophobic filler is present in said white and said neutral bases at from about 0.1 to about 10 percent by weight of said bases.

8. The article of claim 4, further comprising a gel-forming agent, a dispersant, and surfactants.

9. The article of claim 8, further comprising one or more microbicides.

10. The article of claim 9, wherein said vinyl ester latex is present in said white and said neutral bases at from about 10 to about 80 percent by weight of said bases.

11. The article of claim 9 wherein said vinyl ester latex is present in said white and said neutral bases at about 10 to about 50 percent by weight of said bases.

12. The article of claim 9 wherein said vinyl ester latex is present in said white and said neutral bases at about 28 percent by weight of said bases.

13. The article of claim 12 wherein said vinyl ester latex has a total solids content, in percentage by weight, of 54 to 56 percent, has a pH value of 4.5 to 5, has a Brookfield Viscosity of 50 to 200 centipoise, has a wet weight per gallon of 8.85 pounds, has a minimum filming temperature of 14° C., and has a glass transition temperature midpoint value of 15° C.

14. The article of claim 9 wherein said microbicides comprise a bactericide and a fungicide.

* * * * *